UNITED STATES PATENT OFFICE.

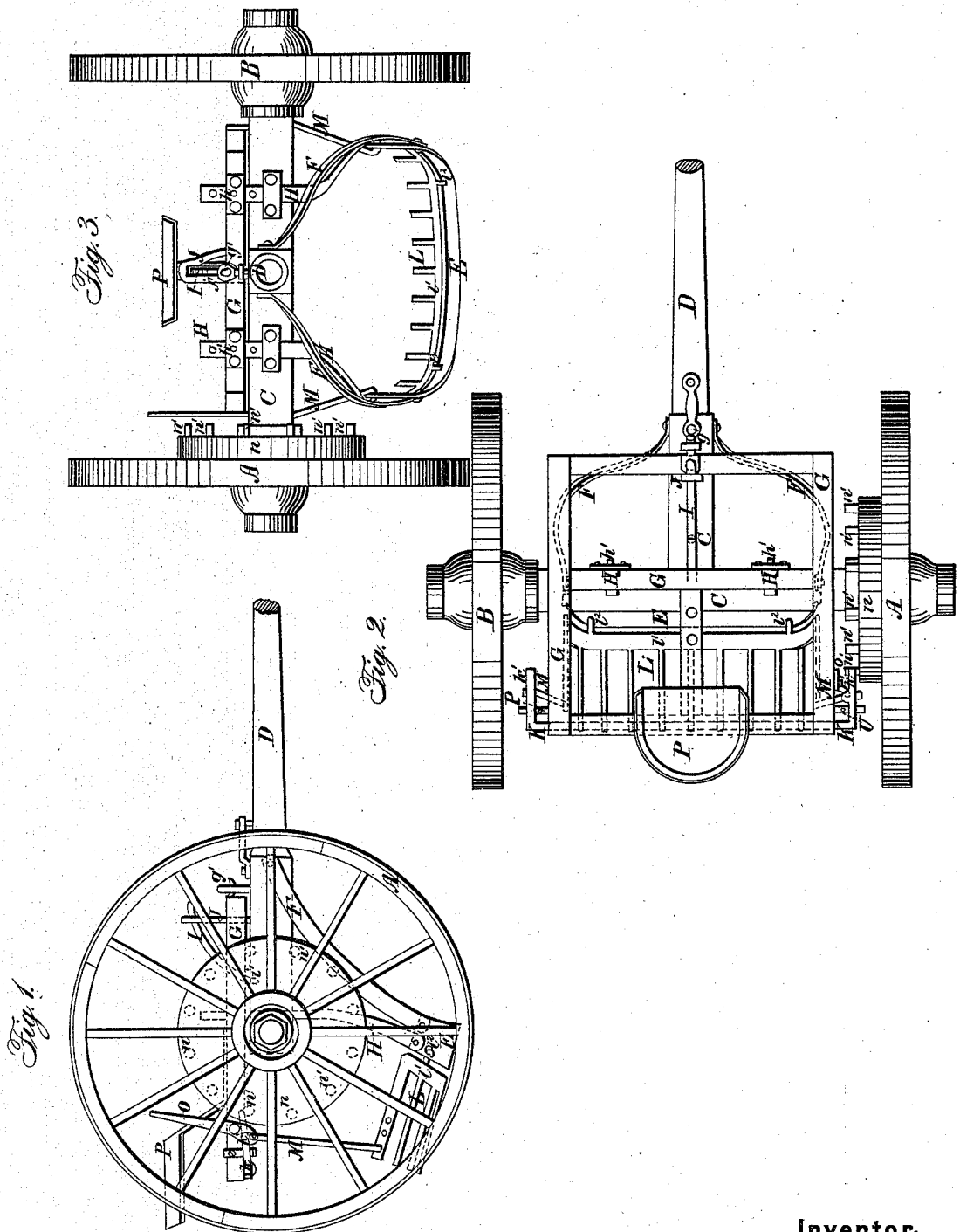

WILLIAM B. RYAN, OF EAST PEMBROKE, NEW YORK.

IMPROVEMENT IN POTATO-DIGGERS.

Specification forming part of Letters Patent No. 35,326, dated May 20, 1862.

*To all whom it may concern:*

Be it known that I, WILLIAM B. RYAN, of East Pembroke, in the county of Genesee and State of New York, have invented certain new and useful Improvements in Potato-Digging Machines; and I do hereby declare that the following is a full, clear, and exact description thereof, reference being had to the accompanying drawings, and the letters of reference marked thereon, in which—

Figure I is a side elevation of my improvement. Fig. II is a top plan of same, and Fig. III is an end elevation.

Letters of like name and kind refer to like parts in each of the figures.

A and B represent two supporting-wheels turning upon the axle C. They are placed at such distance apart as to run in the gutters between the potato-hills.

D represents the draft-pole, firmly fixed to the center of the axle C.

E represents the cutter, which is connected to the draft-pole by the bars or rods F, and to a hinged frame, G, by the bars H. The frame G is rectangular in form, and is hinged to the draft-pole, as shown at $g'$.

The bars H pass up through the axle and are connected to the center cross-piece of the frame G by the pins $h'$.

I is a lever having its fulcrum at $i'$ on the draft-pole. One end of the lever passes beneath the center cross-piece of the frame and the other moves in the guide J. By bearing down upon this end of the lever and catching it under the nib $j'$ the frame G will be raised and supported, and with it the cutter, from the ground while the machine is being moved to and from its work.

K is a rock-shaft lying beneath the rear cross-piece of the frame G, with an arm, K', at each end.

L represents the shaker, which consists of a number of prongs connected to a back piece, $l'$, which is hinged to the rear edge of the cutter, as shown at $l^2$.

M represents connecting-rods which connect the arms of the rock-shaft with the outside prongs of the shaker. Motion is given to the shaker by means of the arrangement and connections of the rock-shaft K with arms K', connecting-rods M, wheel $n$, and trips $n'$. The wheel $n$ is connected to the hub of the driving-wheel A, and the parts are so arranged that as the machine moves forward the trips $n'$ will each in turn strike the rock-shaft arms, and thereby lift the shaker, giving it an up-and-down percussive shaking, as distinguished from a horizontal vibrating motion. This up-and-down percussive motion effectually prevents the shaker from clogging and separates the potatoes from the earth, which is thrown up with them in the most satisfactory manner.

O is a lever for raising the rock-shaft arm so that the projections $n'$ will not engage it when it is desired to stop the motion of the shaker.

P is the driver's seat on the frame G.

The operation will be readily understood from the description. The cutter digs or plows up the potatoes, and they pass back upon the shaker, the percussive motion of which will disengage them from the earth which is dug up with them.

When it is desired to move the machine without operating it the cutter may be raised from the ground by means of the lever I and the rock-shaft thrown out of gear by the lever O, as before described.

I claim—

1. In a machine for digging potatoes, giving the shaker L an up-and-down percussive motion, as distinguished from a horizontal vibrating motion, by means of the rock-shaft K and arms K', wheel $n$, trips $n'$, and connecting-rods M, substantially as set forth.

2. The hinged frame G, in combination with the shaker L, arms H, rods F and M, and cutter E, for the purposes and substantially as described.

WM. B. RYAN.

Witnesses:
JAMES A. ALLEN,
W. H. FORBUSH.